US012734910B2

(12) United States Patent
Kondo

(10) Patent No.: US 12,734,910 B2
(45) Date of Patent: Sep. 15, 2026

(54) POWER TRANSMISSION DEVICE AND POWER RECEPTION DEVICE

(71) Applicant: HONDA MOTOR CO., LTD., Tokyo (JP)

(72) Inventor: Seiichiro Kondo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/062,032

(22) Filed: Feb. 25, 2025

(65) Prior Publication Data

US 2025/0289328 A1 Sep. 18, 2025

(30) Foreign Application Priority Data

Mar. 18, 2024 (JP) ................................ 2024-041915

(51) Int. Cl.
*B60L 53/122* (2019.01)
*B60L 53/62* (2019.01)
(Continued)

(52) U.S. Cl.
CPC ............. *B60L 53/122* (2019.02); *B60L 53/62* (2019.02); *B60L 53/66* (2019.02); *H02J 50/80* (2016.02); *B60L 2210/44* (2013.01)

(58) Field of Classification Search
CPC ... H02J 50/12; H02J 50/80; H02J 7/02; B60L 53/122; B60L 53/62; B60L 53/66; B60L 53/12
See application file for complete search history.

(56) References Cited

U.S. PATENT DOCUMENTS

2012/0286726 A1* 11/2012 Kim ...................... B60L 53/122 320/108
2014/0132212 A1 5/2014 Ichikawa et al.
(Continued)

FOREIGN PATENT DOCUMENTS

JP 2013-005615 A 1/2013
JP 2021-035077 A 3/2021
(Continued)

OTHER PUBLICATIONS

May 13, 2025, Translation of Japanese Office Action issued for related JP Application No. 2024-041915.

*Primary Examiner* — Rexford N Barnie
*Assistant Examiner* — Rasem Mourad
(74) *Attorney, Agent, or Firm* — Paratus Law Group, PLLC

(57) ABSTRACT

A power transmission device includes a power transmission unit which transmits power to a power reception device by contactless power transmission, a power conversion unit which generates supply power using power of a first power supply unit and supplies the supply power to the power transmission unit, and a control unit which acquires information about a terminal voltage of a second power supply unit charged with power received by the power reception device and control the power conversion unit. The control unit executes power feeding control for controlling the supply power via the power conversion unit. Before the power feeding control is executed, power is transmitted to the power reception device, and the control unit acquires characteristic information of a system that charges the second power supply unit. The control unit thereafter controls the supply power during the power feeding control based on the acquired characteristic information.

5 Claims, 3 Drawing Sheets

(51) Int. Cl.
*B60L 53/66* (2019.01)
*H02J 50/80* (2016.01)

(56) References Cited

U.S. PATENT DOCUMENTS

| | | | | |
|---|---|---|---|---|
| 2017/0256993 | A1* | 9/2017 | Nakamura | H02J 50/12 |
| 2020/0338995 | A1* | 10/2020 | Seong | B60L 53/12 |
| 2021/0399583 | A1* | 12/2021 | Nakanishi | H02M 7/219 |
| 2022/0037926 | A1 | 2/2022 | Omori et al. | |
| 2022/0250487 | A1 | 8/2022 | Mao et al. | |
| 2022/0337093 | A1* | 10/2022 | Draak | H02J 50/80 |
| 2022/0360109 | A1* | 11/2022 | Govindaraj | H02J 50/80 |
| 2023/0067135 | A1 | 3/2023 | Omori et al. | |
| 2024/0048002 | A1 | 2/2024 | Lebens et al. | |

FOREIGN PATENT DOCUMENTS

| | | | |
|---|---|---|---|
| JP | 2023-500133 | A | 1/2023 |
| JP | 2023-020323 | A | 2/2023 |
| JP | 2023-554039 | A | 12/2023 |
| WO | WO 2015/104779 | A1 | 7/2015 |

* cited by examiner 100
30
POWER SUPPLY DEVICE
36
THIRD POWER CONVER-SION CIRCUIT
V
35
34
33
SECOND POWER CONVER-SION CIRCUIT
32
RESO-NANT CIRCUIT
31
11
10
VEHICLE-MOUNTED DEVICE
12
RESO-NANT CIRCUIT
13
FIRST POWER CONVER-SION CIRCUIT
14
FILTER
17
BAT
20
40
POWER SUPPLY-SIDE CONTROL UNIT
37
SECOND COMMUNICA-TION UNIT
18
FIRST COM-MUNICATION UNIT
VEHICLE-SIDE CONTROL UNIT

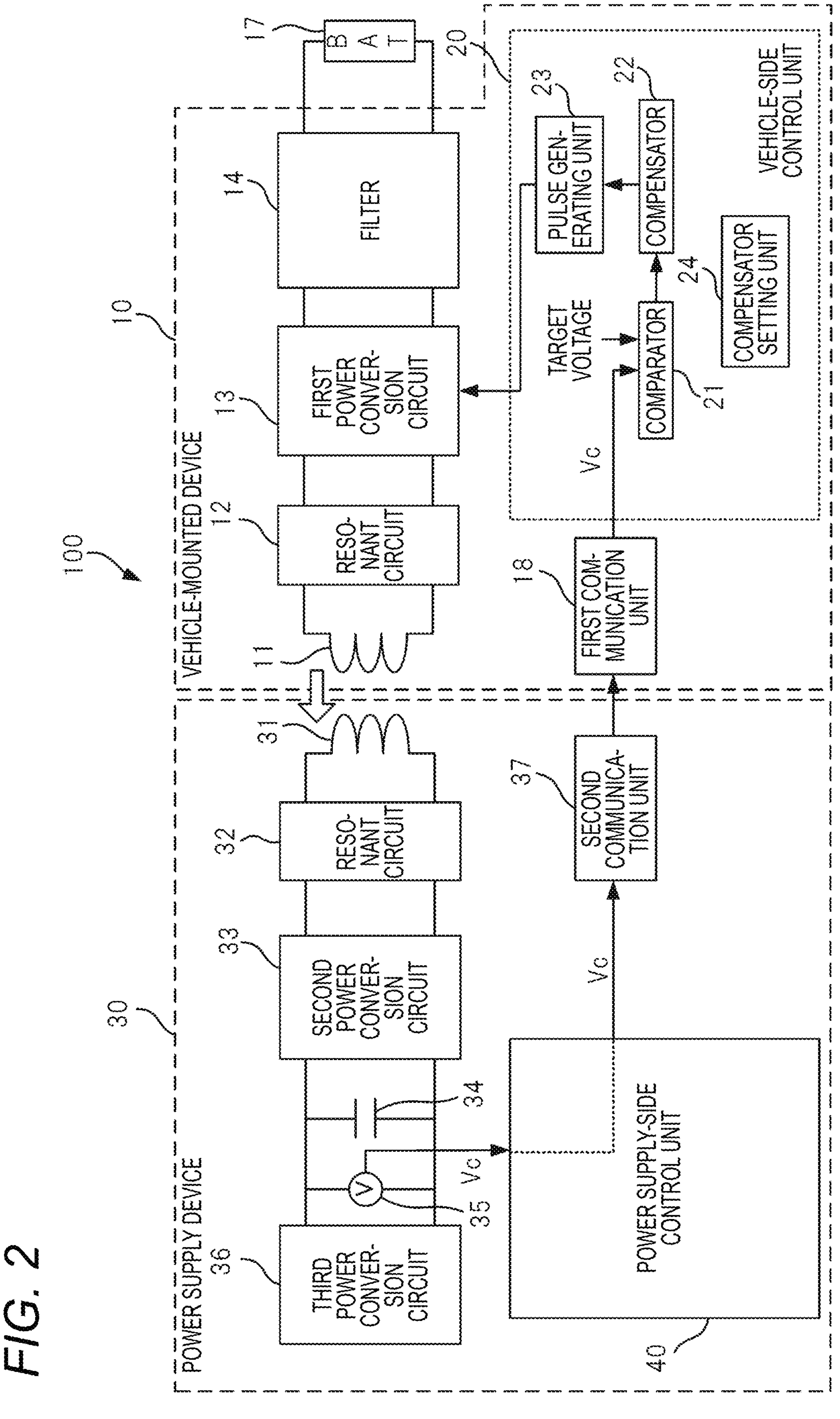
FIG. 2
100
VEHICLE-MOUNTED DEVICE
10
11
12
RESO- NANT CIRCUIT
13
FIRST POWER CONVER- SION CIRCUIT
14
FILTER
17
BAT
20
VEHICLE-SIDE CONTROL UNIT
23
PULSE GEN- ERATING UNIT
22
COMPENSATOR
24
COMPENSATOR SETTING UNIT
TARGET VOLTAGE
COMPARATOR
21
Vc
18
FIRST COM- MUNICATION UNIT
POWER SUPPLY DEVICE
30
31
32
RESO- NANT CIRCUIT
33
SECOND POWER CONVER- SION CIRCUIT
34
V
35
Vc
36
THIRD POWER CONVER- SION CIRCUIT
37
SECOND COMMUNICA- TION UNIT
Vc
POWER SUPPLY-SIDE CONTROL UNIT
40

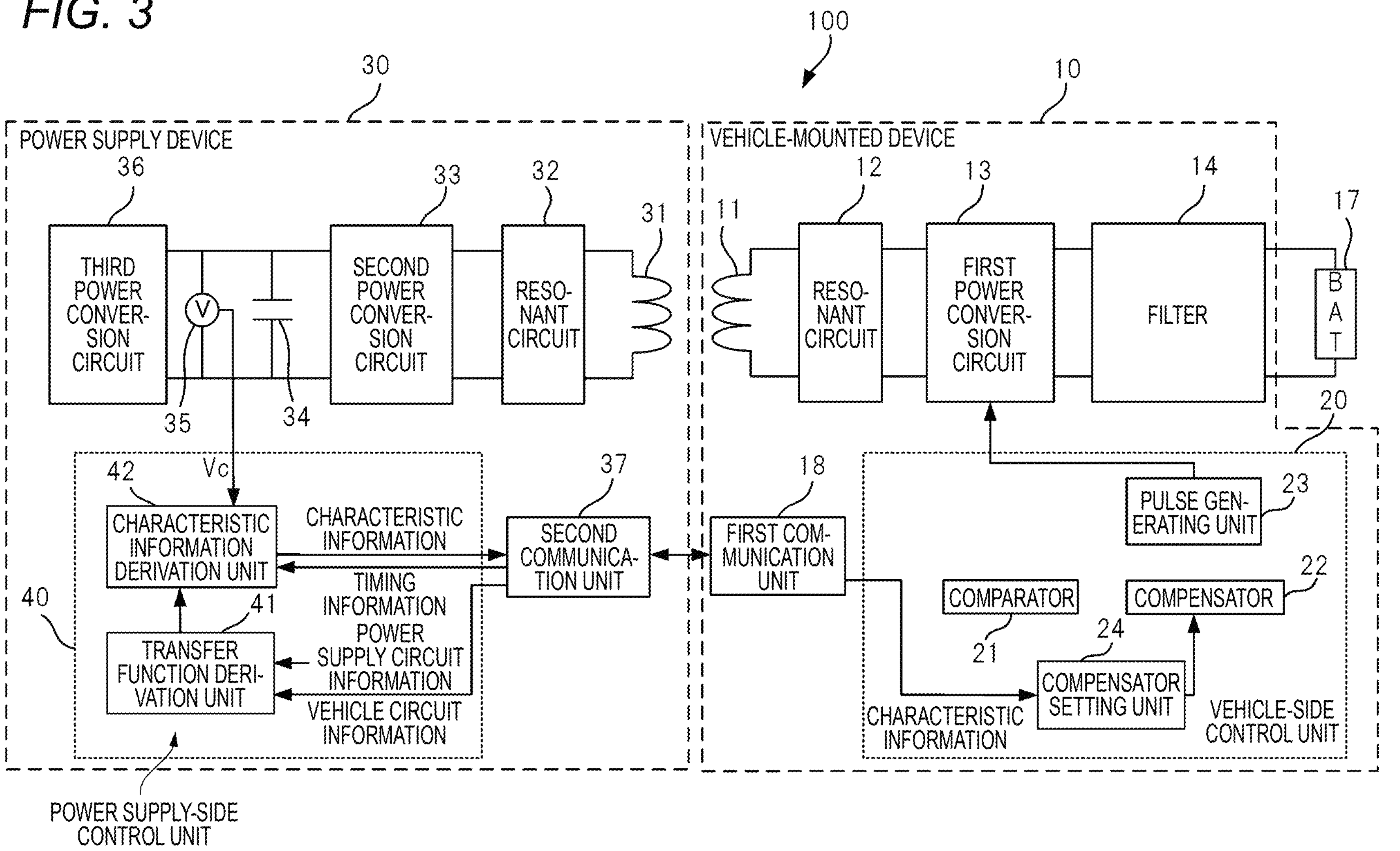
FIG. 3
100
30
POWER SUPPLY DEVICE
36
THIRD POWER CONVER-SION CIRCUIT
33
SECOND POWER CONVER-SION CIRCUIT
32
RESO-NANT CIRCUIT
31
V
35
34
10
VEHICLE-MOUNTED DEVICE
11
12
RESO-NANT CIRCUIT
13
FIRST POWER CONVER-SION CIRCUIT
14
FILTER
17
BAT
20
42
Vc
CHARACTERISTIC INFORMATION DERIVATION UNIT
CHARACTERISTIC INFORMATION
37
SECOND COMMUNICA-TION UNIT
TIMING INFORMATION
POWER SUPPLY CIRCUIT INFORMATION
VEHICLE CIRCUIT INFORMATION
40
41
TRANSFER FUNCTION DERI-VATION UNIT
POWER SUPPLY-SIDE CONTROL UNIT
18
FIRST COM-MUNICATION UNIT
23
PULSE GEN-ERATING UNIT
COMPARATOR
21
22
COMPENSATOR
24
COMPENSATOR SETTING UNIT
CHARACTERISTIC INFORMATION
VEHICLE-SIDE CONTROL UNIT

POWER TRANSMISSION DEVICE AND POWER RECEPTION DEVICE

CROSS-REFERENCE TO RELATED APPLICATIONS

This application is based on and claims priority under 35 USC 119 from Japanese Patent Application No. 2024-041915 filed on Mar. 18, 2024, the entire content of which is incorporated herein by reference.

TECHNICAL FIELD

The technique of the present disclosure relates to a power transmission device and a power reception device.

BACKGROUND ART

In recent years, researches and developments have been conducted on charging and power feeding in a vehicle mounted with a secondary battery that contributes to an increase in energy efficiency in order to allow more users to access affordable, reliable, sustainable, and advanced energy.

For example, as researches and developments related to charging and power feeding, researches and developments related to contactless power transmission in which power is contactlessly transmitted between two devices have been conducted.

JP2013-005615A discloses a power reception device for contactlessly receiving power transferred from a power transmission device by electromagnetic resonance.

JP2023-020323A describes a moving object capable of contactlessly receiving power from an external power transmission device.

JP2023-500133A describes a wireless charging receiving end including a receiver coil, a compensation network, a power converter, and a receiving end controller.

WO2015/104779A describes a contactless power feeding device including a power feeding device and a power reception device, in which the power feeding device includes an inverter, a primary coil, and a power-feeding-side resonant circuit provided between the inverter and the primary coil, and the power reception device includes a secondary coil magnetically coupled to the primary coil and configured to acquire energy from the primary coil, and generates output power by converting the energy acquired by the secondary coil into a voltage.

SUMMARY OF INVENTION

An object of the technique of the present disclosure is to perform optimum power transmission control regardless of a combination, a mutual positional relationship, or the like of a power transmission device and a power reception device.

A first aspect of the present disclosure relates to a power transmission device including:

- a power transmission unit configured to transmit power to a power reception device by contactless power transmission;
- a power conversion unit configured to generate supply power to be supplied to the power transmission unit using power of a first power supply unit, and supply the supply power to the power transmission unit; and
- a control unit configured to be allowed to acquire information about a terminal voltage of a second power supply unit charged with power received by the power reception device and control the power conversion unit, and configured to execute power feeding control for controlling the supply power via the power conversion unit such that the terminal voltage comes to a target voltage,
- in which the control unit is configured to:
  - cause the power transmission unit to transmit predetermined power to the power reception device, and acquire characteristic information of a system that charges the second power supply unit, before executing the power feeding control, the characteristic information being derived based on a time-series transition of the terminal voltage in a case where the predetermined power is transmitted; and
  - control the supply power during the power feeding control based on the acquired characteristic information.

A second aspect of the present disclosure relates to a power reception device including:

- a power reception unit configured to receive power transmitted from a power transmission device by contactless power transmission;
- a power supply unit configured to be allowed to be charged with power received by the power reception unit, and allowed to supply stored power to a load; and
- a control unit,
- in which the power transmission device is configured to execute power feeding control for controlling supply power from the power transmission device to the power reception unit such that a terminal voltage of the power supply unit comes to a target voltage,
- before the power transmission device executes the power feeding control, the control unit is configured to acquire characteristic information of a system that charges the power supply unit based on a time-series transition of the terminal voltage in a case where predetermined power is transmitted from the power transmission device to the power reception unit, and transmit the acquired characteristic information to the power transmission device, and
- the power transmission device controls the supply power during the power feeding control based on the characteristic information.

According to the aspects of the present disclosure, it is possible to perform optimum power transmission control regardless of a combination, a mutual positional relationship, or the like of the power transmission device and the power reception device.

BRIEF DESCRIPTION OF DRAWINGS

Exemplary embodiment(s) of the present invention will be described in detail based on the following figures, wherein:

FIG. 2 is a schematic diagram illustrating an operation state of the contactless power transmission system 100 during execution of power feeding control by a vehicle-mounted device 10; and FIG. 3 is a schematic diagram illustrating an operation state of the contactless power transmission system 100 during execution of compensator setting control.

DESCRIPTION OF EMBODIMENTS

Figure 1:
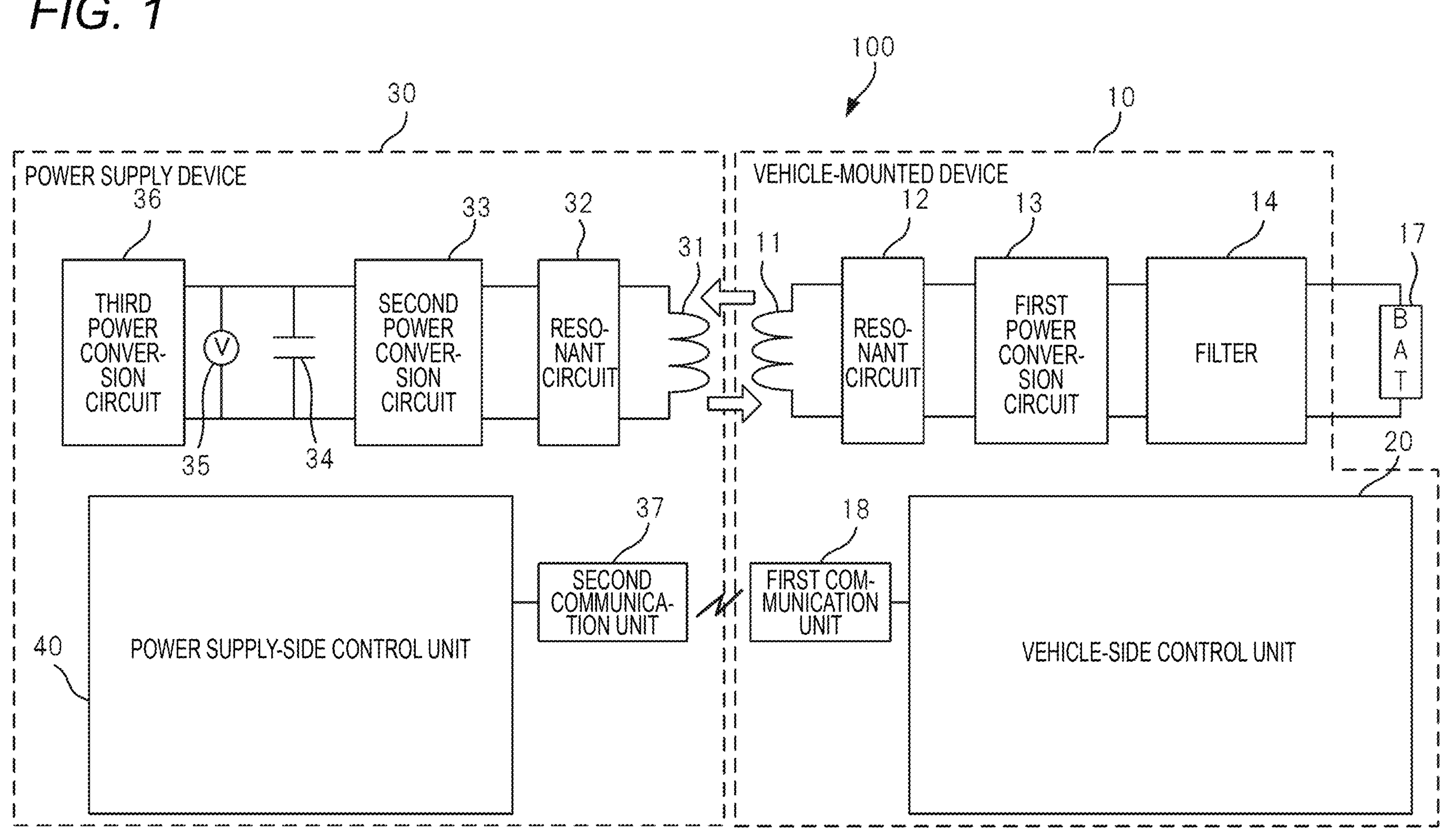
FIG. 1 is a schematic diagram illustrating a contactless power transmission system 100 according to an embodiment of the technique of the present disclosure.

FIG. 1 is a schematic diagram illustrating a contactless power transmission system 100 according to an embodiment of the technique of the present disclosure. The contactless power transmission system 100 includes a vehicle-mounted device 10 mounted on a vehicle or the like, and a power supply device 30 provided in a parking lot, a facility, a house, or the like. The contactless power transmission system 100 is configured to be able to perform first power transmission from the vehicle-mounted device 10 to the power supply device 30. The vehicle-mounted device 10 and the power supply device 30 perform contactless power transmission using magnetic coupling between coils of, for example, a magnetic resonance method or an electromagnetic induction method.

The vehicle on which the vehicle-mounted device 10 is mounted includes a secondary battery 17 (denoted as BAT in the figure) such as a lithium-ion battery or a nickel-hydrogen battery, and includes an electric motor as a drive source driven by power of the secondary battery 17. For example, the vehicle is an automobile including wheels (none illustrated) including drive wheels driven by power of the electric motor and driven wheels that can be steered.

The vehicle-mounted device 10 includes a vehicle-side coil 11, a resonant circuit 12 connected to the vehicle-side coil 11, a first power conversion circuit 13 connected to the resonant circuit 12, a filter 14 provided between the first power conversion circuit 13 and the secondary battery 17, a first communication unit 18, and a vehicle-side control unit 20. The resonant circuit 12 includes, for example, a capacitor connected in series to the vehicle-side coil 11. During the first power transmission, the vehicle-side coil 11 and the resonant circuit 12 constitute a power transmission unit that transmits power to the power supply device 30 by contactless power transmission.

During the first power transmission, the first power conversion circuit 13 generates supply power to be supplied to the vehicle-side coil 11 and the resonant circuit 12 using the power of the secondary battery 17, and supplies the supply power to the vehicle-side coil 11 and the resonant circuit 12. The first power conversion circuit 13 includes a switching element such as a transistor, and operates, for example, as an inverter that converts a direct current supplied from the secondary battery 17 into a high-frequency alternating current during the first power transmission. The high-frequency alternating current converted by the first power conversion circuit 13 is input to the vehicle-side coil 11, and a high-frequency alternating current is induced by an electromagnetic induction effect in a power supply-side coil 31 of the power supply device 30 facing the vehicle-side coil 11 with a gap therebetween.

The filter 14 is provided to stabilize power and remove noise.

The first communication unit 18 is an interface for performing near field wireless communication. For the near field wireless communication, for example, Wi-Fi (Registered trademark), Bluetooth (Registered trademark), or the like can be used.

The vehicle-side control unit 20 includes a processor such as a central processing unit (CPU) and a memory, and executes various controls related to power transmission.

The power supply device 30 includes the power supply-side coil 31, a resonant circuit 32 connected to the power supply-side coil 31, a second power conversion circuit 33 connected to the resonant circuit 32, a capacitor 34 connected to the second power conversion circuit 33, a voltage detection circuit 35 configured to detect a terminal voltage Vc of the capacitor 34, a third power conversion circuit 36 connected to the capacitor 34, a second communication unit 37, and a power supply-side control unit 40.

The resonant circuit 32 includes, for example, a capacitor connected in series to the power supply-side coil 31. During the first power transmission, the power supply-side coil 31 and the resonant circuit 32 constitute a power reception unit that receives power transmitted from the vehicle-mounted device 10 by the contactless power transmission.

The second power conversion circuit 33 operates as a rectifier during the first power transmission, and converts a high-frequency alternating current input from the power supply-side coil 31 into a direct current.

The capacitor 34 is charged with the direct current converted by the second power conversion circuit 33. During the first power transmission, the capacitor 34 is configured to be able to supply the stored power to a load connected to the third power conversion circuit 36.

The third power conversion circuit 36 operates as an inverter during the first power transmission, and converts a direct current discharged from the capacitor 34 into an alternating current having a frequency of a commercial power supply. The alternating current having a commercial frequency converted by the third power conversion circuit 36 is supplied to a load such as a power grid or a home appliance.

The second communication unit 37 is an interface for performing near field wireless communication. For the near field wireless communication, for example, Wi-Fi (Registered trademark), Bluetooth (Registered trademark), or the like can be used.

The power supply-side control unit 40 includes a processor such as a central processing unit (CPU) and a memory, and executes overall control on the power supply device 30.

During the first power transmission, the vehicle-side control unit 20 acquires information about the terminal voltage Vc of the capacitor 34 of the power supply device 30, and executes power feeding control for controlling the supply power supplied to the vehicle-side coil 11 and the resonant circuit 12 via the first power conversion circuit 13 such that the terminal voltage Vc comes to a predetermined target voltage.

In this way, the vehicle-side control unit 20 uses a system (a charging system including the resonant circuit 12, the vehicle-side coil 11, the power supply-side coil 31, the resonant circuit 32, and the second power conversion circuit 33, which are provided between the first power conversion circuit 13 and the capacitor 34) that charges the capacitor 34 with the power transmitted from the vehicle-mounted device 10 as a control target to control input power (feedback control) of the control target such that an output voltage (synonymous with the terminal voltage Vc) of the control target comes to a target voltage. Hereinafter, a transfer function of the control target is referred to as a transfer function G(s).

FIG. 2 is a schematic diagram illustrating an operation state of the contactless power transmission system 100 during execution of power feeding control by the vehicle-mounted device 10. When the power feeding control is started, the power supply-side control unit 40 acquires information about the terminal voltage Vc from the voltage detection circuit and executes control to transmit the acquired information about the terminal voltage Vc from the second communication unit 37 to the vehicle-mounted device 10. The terminal voltage Vc transmitted from the second communication unit 37 is received by the first communication unit 18 and acquired by the vehicle-side control unit 20.

As illustrated in FIG. 2, the vehicle-side control unit 20 includes a comparator 21, a compensator 22, a pulse generating unit 23, and a compensator setting unit 24. These are configured by hardware, software, or a combination thereof. The comparator 21 compares the terminal voltage Vc acquired by the first communication unit 18 with the target voltage, and outputs a deviation therebetween.

The compensator 22 determines, based on the deviation input from the comparator 21 and various setting values (for example, information on P term, I term, and D term in the case of a PID compensator) set by the compensator setting unit 24, input power to the control target required for optimizing the output of the control target represented by the transfer function G(s) (achieving a state with good responsiveness and no oscillation).

Specifically, the compensator 22 determines the input power to the control target such that a phase margin between the input and the output of the control target is 0 degree or more. The pulse generating unit 23 generates a drive pulse and supplies the drive pulse to the first power conversion circuit 13 such that the power output from the first power conversion circuit 13 becomes the input power determined by the compensator 22.

The compensator setting unit 24 determines a setting value of the compensator 22 such that the phase margin between the input and the output of the control target is 0 degree or more, and sets the determined setting value in the compensator 22. If respective values (frequencies) of a pole and a zero in the transfer function G(s) are determined, the setting value of the compensator 22 at which the phase margin between the input and the output of the control target is 0 degree or more can be determined based on the values.

However, the transfer function G(s) may vary depending on a combination of the vehicle-mounted device 10 and the power supply device 30, a positional relationship between the vehicle-side coil 11 and the power supply-side coil 31, or the like. Therefore, in the present embodiment, by using the output of the control target when the control target is operated under a specific condition, an appropriate setting value according to the combination of the vehicle-mounted device 10 and the power supply device 30 and the positional relationship between the vehicle-side coil 11 and the power supply-side coil 31 can be set in the compensator 22.

Before the power feeding control is executed, that is, at a timing before the supply power to the vehicle-side coil 11 and the resonant circuit 12 is determined by the comparator 21 and the compensator 22, the vehicle-side control unit 20 executes compensator setting control in which a drive pulse having a predetermined pattern (a pattern with a fixed pulse width and fixed frequency) is generated by the pulse generating unit 23, and the first power conversion circuit 13 is controlled in accordance with the drive pulse to control the supply power to the vehicle-side coil 11 and the resonant circuit 12 to predetermined power (a constant value).

FIG. 3 is a schematic diagram illustrating an operation state of the contactless power transmission system 100 during execution of compensator setting control. Before starting the compensator setting control, the vehicle-side control unit 20 transmits trigger information to the power supply device 30 via the first communication unit 18. When the power supply-side control unit 40 acquires the trigger information via the second communication unit 37, the power supply-side control unit 40 starts recording the terminal voltage Vc detected by the voltage detection circuit 35 in the memory. The vehicle-side control unit 20 starts the compensator setting control after the trigger information is transmitted, and transmits timing information indicating a timing when the compensator setting control is started to the power supply device 30 via the first communication unit 18. When the compensator setting control is started, constant power is transmitted from the vehicle-mounted device 10 to the power supply device 30, the capacitor 34 is charged with the power, and the terminal voltage Vc increases. A time-series transition of the terminal voltage Vc is recorded in the memory of the power supply-side control unit 40 in advance.

The power supply-side control unit 40 includes a transfer function derivation unit 41 and a characteristic information derivation unit 42. The transfer function derivation unit 41 acquires power supply circuit information related to a circuit element included in the power supply device 30 among the control targets stored in the memory. The transfer function derivation unit 41 acquires, from the vehicle-mounted device 10 via the second communication unit 37, vehicle circuit information related to a circuit element included in the vehicle-mounted device 10 among the control targets. The power supply circuit information and the vehicle circuit information are information on circuit elements related to the transfer function of the control target, and are, for example, the number or a connection relationship of capacitors, coils, and resistors, a value of each circuit element, and the like.

The transfer function derivation unit 41 derives the transfer function G(s) of the control target based on the power supply circuit information and the vehicle circuit information with unknown coefficients. Based on the transfer function G(s), the number of poles and the number of zeros can be determined. Depending on a combination of the power supply circuit information and the vehicle circuit information, the number of poles and zeros in the transfer function G(s) may change.

The characteristic information derivation unit 42 specifies a terminal voltage Vc at the time when the compensator setting control is started, among the terminal voltages Vc recorded in the memory, according to the timing information and the trigger information acquired from the vehicle-mounted device 10. The characteristic information derivation unit 42 derives a coefficient of the transfer function G(s) from a relationship between a value of the terminal voltage Vc every time a predetermined time elapses starting from a detection time of the specified terminal voltage Vc and the transfer function G(s) derived by the transfer function derivation unit 41, and derives a value (frequency) of the pole and a value (frequency) of the zero of the transfer function G(s) from the transfer function G(s) having the derived coefficient. The value (frequency) of the pole and the value (frequency) of the zero of the transfer function G(s) are described as characteristic information of the transfer function G(s). The characteristic information derivation unit 42 transmits the derived characteristic information to the vehicle-mounted device 10 via the second communication unit 37.

In the vehicle-mounted device 10, the vehicle-side control unit 20 acquires the characteristic information derived by the power supply device 30 via the first communication unit 18. The vehicle-side control unit 20 inputs the acquired characteristic information to the compensator setting unit 24. The compensator setting unit 24 performs setting of the compensator 22 for optimizing the output of the control target (the phase margin is 0 degree or more) based on the input characteristic information. When the setting of the setting value of the compensator 22 is completed, the vehicle-side control unit 20 starts the power feeding control.

As described above, according to the contactless power transmission system 100, the supply power during the power feeding control is controlled based on the characteristic information acquired based on the time-series transition of the terminal voltage of the capacitor 34 in a case where the predetermined power is transmitted from the vehicle-mounted device 10 to the power supply device 30 before the power feeding control is started. Therefore, the optimum power transmission control can be performd regardless of the combination of the vehicle-mounted device 10 and the power supply device 30, the positional relationship between the vehicle-side coil 11 and the power supply-side coil 31, and the like.

In the above description, the power supply device 30 derives the characteristic information of the transfer function G(s) of the control target based on the time-series transition of the terminal voltage Vc during the compensator setting control. However, the vehicle-side control unit 20 may derive the characteristic information.

In this case, the vehicle-side control unit 20 acquires the power supply circuit information from the power supply device 30, and derives the transfer function G(s) based on the power supply circuit information and the vehicle circuit information of the host vehicle. Upon receiving the trigger information from the vehicle-mounted device 10, the power supply-side control unit 40 of the power supply device 30 starts recording the terminal voltage Vc. After recording the terminal voltage Vc for a certain period of time, the power supply-side control unit 40 of the power supply device 30 transmits data on the terminal voltage Vc to the vehicle-mounted device 10. The vehicle-side control unit 20 acquires the data and derives the characteristic information of the transfer function G(s) based on the transfer function G(s) derived as described above and the data. With the above configuration, the cost and processing load of the power supply device 30 can be reduced.

In the present description, at least the following matters are described.

Corresponding constituent elements and the like in the embodiments described above are shown in parentheses, but the present invention is not limited thereto.

(1) A power transmission device (vehicle-mounted device 10) including:

a power transmission unit (vehicle-side coil 11 and resonant circuit 12) configured to transmit power to a power reception device (power supply device 30) by contactless power transmission;

a power conversion unit (first power conversion circuit 13) configured to generate supply power to be supplied to the power transmission unit using power of a first power supply unit (secondary battery 17), and supply the supply power to the power transmission unit; and a control unit (vehicle-side control unit 20) configured to be allowed to acquire information about a terminal voltage (terminal voltage Vc) of a second power supply unit (capacitor 34) charged with power received by the power reception device and control the power conversion unit, and configured to execute power feeding control for controlling the supply power via the power conversion unit such that the terminal voltage comes to a target voltage, in which the control unit is configured to:

cause the power transmission unit to transmit predetermined power to the power reception device, and acquire characteristic information of a system that charges the second power supply unit, before executing the power feeding control, the characteristic information being derived based on a time-series transition of the terminal voltage in a case where the predetermined power is transmitted; and control the supply power during the power feeding control based on the acquired characteristic information.

According to (1), the supply power during the power feeding control is controlled based on the characteristic information acquired based on the time-series transition of the terminal voltage of the second power supply unit in the case where the predetermined power is transmitted from the power transmission device to the power reception device before the power feeding control is started. Therefore, the supply power can be controlled in consideration of the combination of circuit configurations of the power transmission device and the power reception device and a mutual positional relationship thereof. As a result, the optimum power transmission control can be executed regardless of the combination or the mutual positional relationship of the power transmission device and the power reception device.

(2) The power transmission device according to (1), in which the characteristic information includes transfer function information related to a transfer function of the system, and the control unit is configured to control the supply power during the power feeding control based on the transfer function information.

According to (2), the power feeding control can be appropriately executed by controlling the supply power based on the transfer function information obtained by transmitting the predetermined power before the power feeding control.

(3) The power transmission device according to (2), in which the transfer function information is information indicating a pole and a zero of the transfer function, and the control unit is configured to control the supply power based on the information indicating the pole and the zero such that a phase margin is 0 degree or more.

According to (3), it is possible to appropriately execute the power feeding control.

(4) The power transmission device according to (3), in which the control unit is configured to acquire the information indicating the pole and the zero by receiving the information from the power reception device, the information being derived by the power reception device based on a time-series transition of the terminal voltage in a case where the predetermined power is transmitted from the power transmission device to the power reception device.

According to (4), since it is not necessary to derive the pole and the zero on the power transmission device side, it is possible to reduce manufacturing cost and to reduce a load during operation.

(5) The power transmission device according to (3), in which the control unit acquires the information indicating the pole and the zero by deriving the pole and the zero based on a time-series transition of the terminal voltage in a case where the predetermined power is transmitted from the power transmission device to the power reception device.

According to (5), since it is not necessary to derive the pole and the zero on the power reception device side, it is possible to reduce manufacturing cost of the power reception device and reduce a load during operation of the power reception device.

(6) The power transmission device according to any one of (1) to (5), in which the predetermined power is constant power.

According to (6), the characteristic information can be derived easily and accurately.

(7) The power transmission device according to any one of (1) to (6), in which the power transmission device is provided in a vehicle having an electric motor as a drive source driven by power of the first power supply unit.

According to (7), the power can be transmitted from the vehicle to a load connected to the power reception device, and it is possible to effectively use surplus power of the vehicle and use vehicle power in the event of a disaster.

(8) A power reception device (power supply device 30) including:

a power reception unit (power supply-side coil 31 and resonant circuit 32) configured to receive power transmitted from a power transmission device (vehicle-mounted device 10) by contactless power transmission;

a power supply unit (capacitor 34) configured to be allowed to be charged with power received by the power reception unit, and allowed to supply stored power to a load; and a control unit (power supply-side control unit 40), in which the power transmission device is configured to execute power feeding control for controlling supply power from the power transmission device to the power reception unit such that a terminal voltage (terminal voltage Vc) of the power supply unit comes to a target voltage, before the power transmission device executes the power feeding control, the control unit is configured to acquire characteristic information of a system that charges the power supply unit based on a time-series transition of the terminal voltage in a case where predetermined power is transmitted from the power transmission device to the power reception unit, and transmit the acquired characteristic information to the power transmission device, and the power transmission device controls the supply power during the power feeding control based on the characteristic information.

According to (8), the supply power during the power feeding control is controlled by the power transmission device based on the characteristic information acquired based on the time-series transition of the terminal voltage of the power-receiving-side power supply unit in the case where the predetermined power is transmitted from the power transmission device to the power reception device before the power feeding control is started. Therefore, the supply power can be controlled in consideration of the combination of circuit configurations of the power transmission device and the power reception device and a mutual positional relationship thereof. As a result, the optimum power transmission control can be executed regardless of the combination or the mutual positional relationship of the power transmission device and the power reception device.

(9) The power reception device according to (8), in which the characteristic information includes transfer function information related to a transfer function of the system.

(10) The power reception device according to (9), in which the transfer function information is information indicating a pole and a zero of the transfer function.

What is claimed is:

1. A power transmission device comprising:

a power transmission circuit configured to transmit power to a power reception device by contactless power transmission;

a first power conversion circuit configured to generate supply power to be supplied to the power transmission circuit using power of a first power supply circuit, and supply the supply power to the power transmission circuit; and a processor configured to acquire information about a terminal voltage of a second power supply circuit charged with power received by the power reception device and control the first power conversion circuit, and configured to execute power feeding control for controlling the supply power via the first power conversion circuit such that the terminal voltage comes to a target voltage, wherein the processor is configured to:

cause the power transmission circuit to transmit predetermined power to the power reception device, and acquire characteristic information of a system that charges the second power supply circuit, before executing the power feeding control, the characteristic information being derived based on a time-series transition of the terminal voltage while the predetermined power is transmitted, the system including the power transmission circuit, a power reception circuit in the power reception device, which receives power transmitted from the power transmission circuit by the contactless power transmission, and a second power conversion circuit in the power reception device, which supplies the power received by the power reception circuit to the second power supply circuit; and control the supply power during the power feeding control based on the acquired characteristic information, wherein the characteristic information includes transfer function information related to a transfer function of the system, wherein the processor is configured to control the supply power during the power feeding control based on the transfer function information, wherein the transfer function information is information indicating a pole and a zero of the transfer function, and wherein the processor is configured to control the supply power based on the information indicating the pole and the zero such that a phase margin is 0 degree or more.

2. The power transmission device according to claim 1, wherein the processor is configured to acquire the information indicating the pole and the zero by receiving the information from the power reception device, the information being derived by the power reception device based on a time-series transition of the terminal voltage while the predetermined power is transmitted from the power transmission device to the power reception device.

3. The power transmission device according to claim 1, wherein the processor acquires the information indicating the pole and the zero by deriving the pole and the zero based on a time-series transition of the terminal voltage while the predetermined power is transmitted from the power transmission device to the power reception device.

4. The power transmission device according to claim 1, wherein the predetermined power is constant power.

5. The power transmission device according to claim 1, wherein the power transmission device is provided in a vehicle having an electric motor as a drive source driven by power of the first power supply circuit.

* * * * *